C. P. BURT.
STOCK CHUTE FOR DIPPING VATS.
APPLICATION FILED JUNE 21, 1920.
1,380,189. Patented May 31, 1921.
2 SHEETS—SHEET 1.
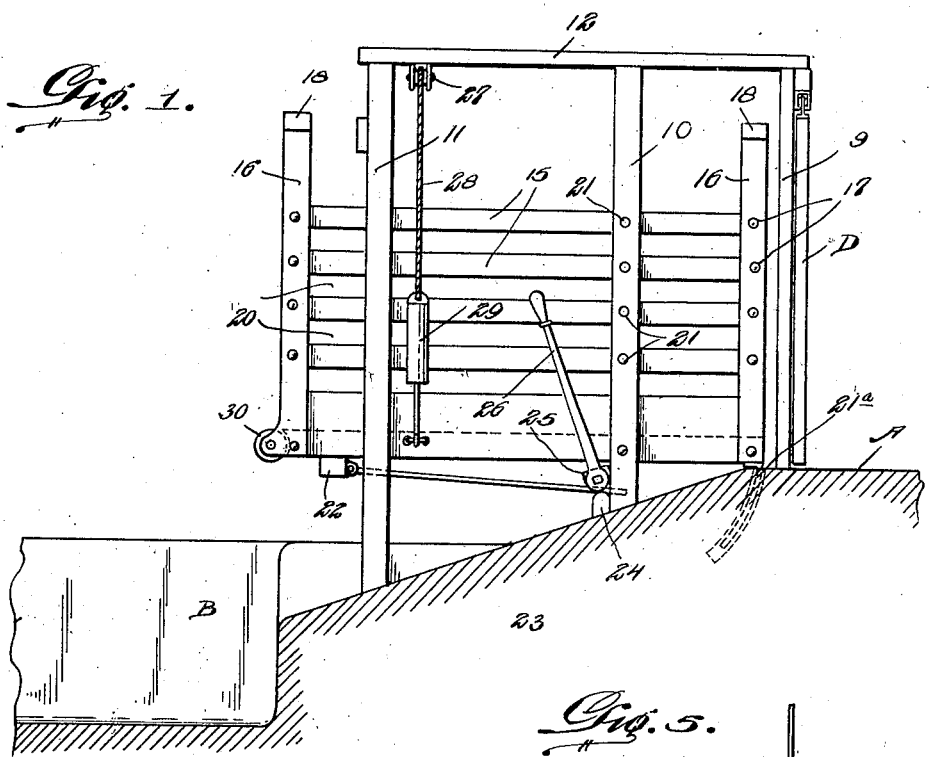
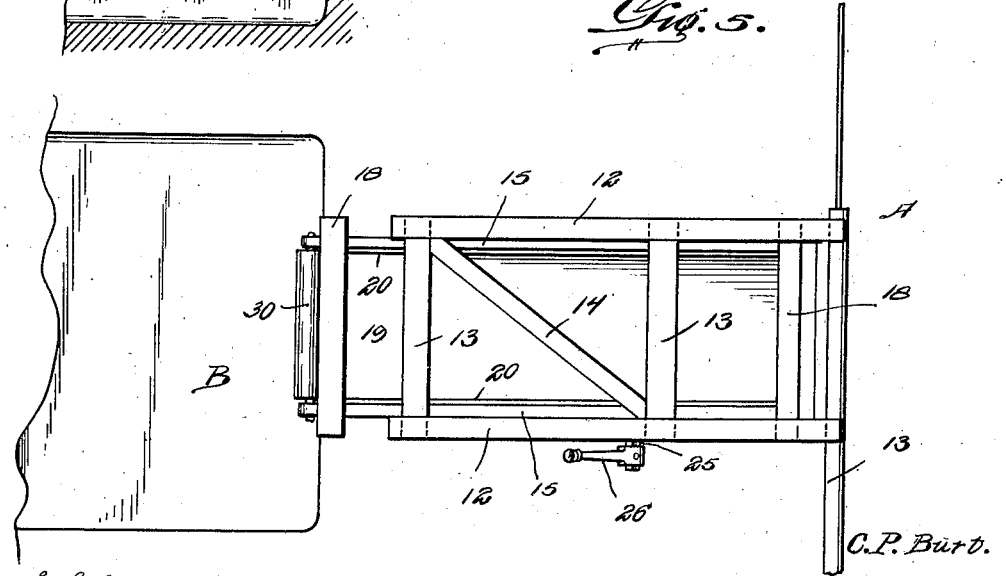

C. P. BURT.
STOCK CHUTE FOR DIPPING VATS.
APPLICATION FILED JUNE 21, 1920.
1,380,189.
Patented May 31, 1921.
2 SHEETS—SHEET 2.
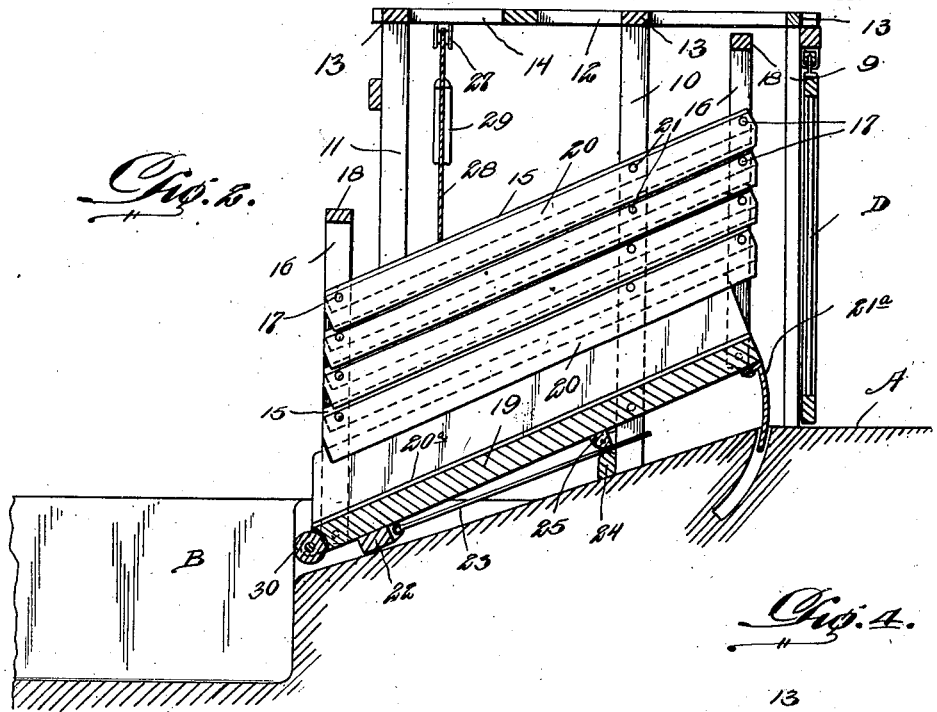
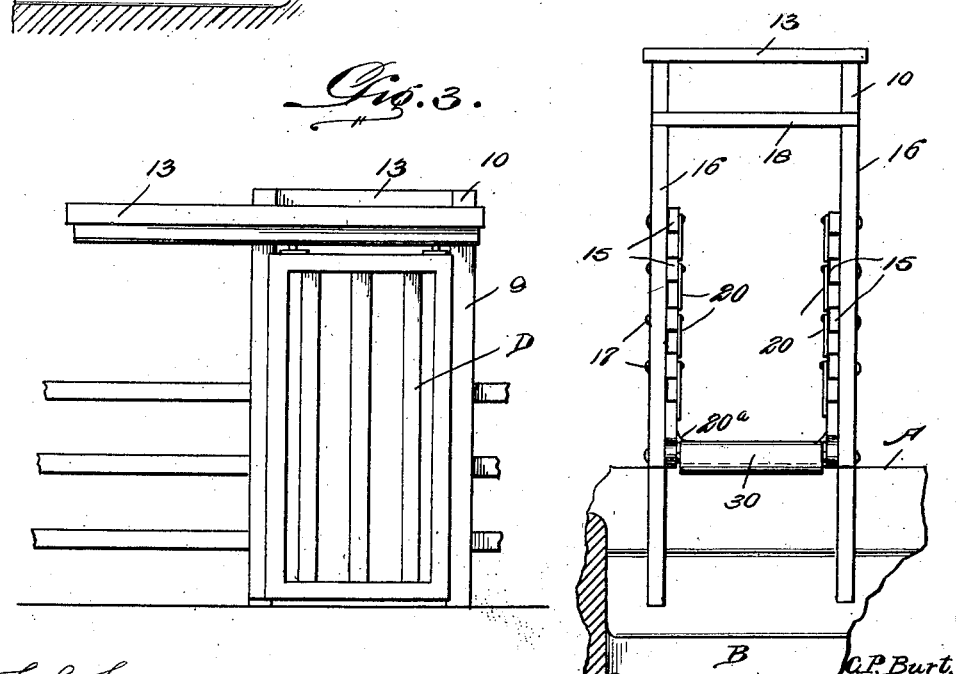
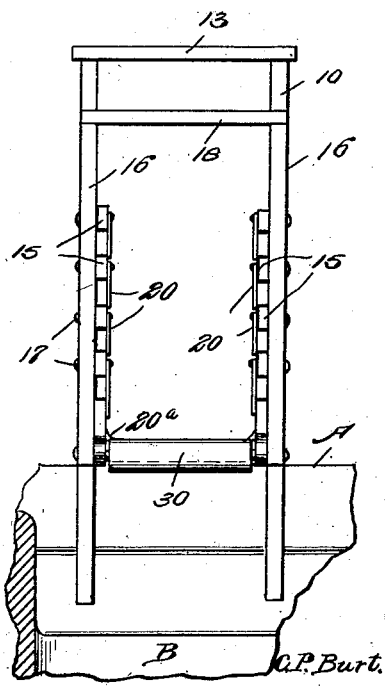

UNITED STATES PATENT OFFICE.

CLEMENT P. BURT, OF WALLIS, TEXAS.

STOCK-CHUTE FOR DIPPING-VATS.

1,380,189.  Specification of Letters Patent.  Patented May 31, 1921.

Application filed June 21, 1920. Serial No. 390,635.

*To all whom it may concern:*

Be it known that I, CLEMENT P. BURT, a citizen of the United States, residing at Wallis, in the county of Austin and State of Texas, have invented new and useful Improvements in Stock-Chutes for Dipping-Vats, of which the following is a specification.

This invention relates to devices for handling stock during or preliminary to the process of immersing them in a vat of antiseptic or the like, and has for its object the provision of a chute adapted to be positioned adjacent one side of an immersion vat or trough and so constructed as to be in an initially inclined position facilitating the entrance of the animal, being maintained in such position by a counterbalancing weight, the construction being such that when the animal driven upon the chute approaches the discharge end thereof the weight of the animal will overcome the effect of the counterbalancing weight and will cause the discharge end of the chute to move downwardly precipitating the animal into the vat or trough.

An object is the provision of a device of this character which is provided with a peculiarly constructed and arranged brake means for preventing too rapid tilting of the chute in either direction.

Another object is the provision of a chute of this character which will be very simple and inexpensive in manufacture, which may be quickly and easily assembled by even an unskilled person, which will be efficient in service, and a general improvement in the art.

With the above and other objects and advantages in view, the invention consists in the details of construction to be hereinafter more fully described and claimed, and illustrated in the accompanying drawings in which—

Figure 1 is a side elevation of the device in its initial position,

Fig. 2 is a longitudinal sectional view showing the chute in its discharge position, Fig. 3 is an elevation of the entrance end, Fig. 4 is an elevation of the discharge end, and Fig. 5 is a plan view.

Referring more particularly to the drawings, the letter A designates the surface of the ground and B designates one end of a dipping vat adjacent which my device is positioned.

In carrying out my invention, I provide six vertical posts arranged in pairs 9, 10 and 11 and driven into the ground. The upper ends of the posts are connected by longitudinal bars 12, cross bars 13, and diagonal bracing bars 14 whereby to provide a strong rigid structure. This constitutes the stationary portion of the device. One cross bar 13 is of greater length than the others and supports a sliding door D mounted on rollers, and which controls communication between my device and a pen.

The movable chute comprises sides formed of a plurality of slats 15 which are connected at their ends by vertically extending bars 16 to which the slats are pivotally connected, as shown at 17. The bars 16 are connected at their upper ends by cross bars 18. A floor 19 is secured between the two lowermost slats 15 and all the slats have secured upon their inner faces, boards 20 constituting a lining. The floor extends beyond the sides, as shown. This movable chute is disposed between the pairs of posts 10 and 11 and is secured to the posts 10 by a plurality of bolts 21, one of which extends through each slat and a post whereby the slats will be pivotally mounted with respect to the posts 10. Secured at the junctures of the sides with the floor are members or bars 20$^a$ which are triangular in cross section and which are for the purpose of preventing the animals from slipping against the sides and secured at the entrance end of the chute upon the floor thereof are bars 21$^a$ which are for the purpose of preventing the animals from catching their feet beneath the chute.

Secured upon the under side of the floor 19 adjacent one end thereof, is a transverse bar 22 to which is pivotally connected a bar 23 which extends longitudinally beneath the floor and which extends above a fixed cross bar 24 extending across the posts 10 and having a rounded upper surface, as shown. Journaled upon the posts 10 beneath the floor and immediately above the bar 24, is a cam bar 25 engaging upon the top of the longitudinal bar 23 and provided with an operating handle 26.

Secured upon the under side of the bars 12 connecting the tops of the posts 10 and 11, are pulleys 27 over which are trained cables 28 which are secured at one end to the lowermost slats 15 and which have their other ends provided with heavy weights 29 which are for the purpose of counterbalancing the long end of the chute so that this long end of the chute, that is the end most remote from the pivot points 21, will remain in a normally elevated position, as clearly shown in Fig. 1.

In the operation of the device, the parts being in the normal or initial position shown in Fig. 1, the animals are driven one at a time, onto the chute. As an animal passes along the chute and approaches the discharge end thereof, his weight will overcome the effect of the counterbalancing weights 29 and the discharge end of the chute will descend into the position shown in Fig. 2, precipitating or at least causing the animal to slide from off the chute and into the vat or trough. A roller 30 is journaled between the lower ends of the vertical bars 16 at the discharge end of the chute to prevent injury to the animal. After the animal is precipitated from the chute the effect of the weights 29 will cause the discharge end of the chute to be elevated to its initial position in readiness to receive the next animal. Whenever it is desired to check the speed of the ascent or descent of the discharge end of the chute, it is merely necessary that the operator grasp the handle 26 and rotate the cam bar 25 so that the longitudinal bar 23 will be gripped to the desired extent between the cam bar 25 and the cross bar 24 so as to exert sufficient pressure upon the bar 23 to prevent too free longitudinal movement thereof. Checking movement of the bar 23 will of course result in checking the movement of the chute and its speed will be consequently controllable. Owing to the fact that the slats 15 are pivotally connected with the vertical bars 16, and also pivotally connected with the posts 10, it will be understood that the sides of the chute will always be in the form of a parallelogram, regardless of the position of the chute and that the bars 16 will always extend vertically.

From the foregoing description and a study of the drawings it will be apparent that I have thus provided a very simple device by means of which animals may be precipitated into a dipping vat without danger of injury to the animal, and with the minimum degree of inconvenience to the operator. It will also be apparent that the construction is simple and that there is very little likelihood of derangement of the parts.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. A device of the character described comprising two pairs of posts extending vertically and arranged in spaced relation, a chute including sides each formed of a plurality of slats connected at their ends and each pivotally connected with the posts of one pair, said pivot points being nearer one end of the chute than the other whereby the discharge end of the chute will be heavier, pulleys connected with the other pair of said posts, cables secured to said longer end of the chute and trained about said pulleys, counterbalancing weights carried by said cables for holding said discharge end normally elevated, and means connected with said chute and said first named pair of posts whereby to serve as a brake for controlling the speed of movement of said chute.

2. A device of the character described comprising a pair of supporting posts, a chute pivoted between said posts, counterbalancing means normally holding one end of said chute elevated, and means for controlling the speed of movement of said chute under the influence of an animal driven thereonto, said means comprising a stationary bar extending across said posts beneath said chute, a longitudinally extending bar pivotally connected with the bottom of said chute and resting upon said transverse bar, and a cam bar pivoted upon said posts and engageable with said longitudinal bar and provided with an operating handle whereby said longitudinal bar may be firmly held between said transverse bar and said cam bar.

In testimony whereof I affix my signature.

CLEMENT P. BURT.